United States Patent [19]

Nakamura et al.

[11] Patent Number: 4,704,165

[45] Date of Patent: Nov. 3, 1987

[54] PIGMENT COMPOSITION

[75] Inventors: Michiei Nakamura, Soka; Hitoshi Takeuchi, Saitama; Tetujiro Takahashi; Minoru Takizawa, both of Koshigaya; Shojiro Horiguchi, Omiya, all of Japan

[73] Assignee: Dainichiseika Color & Chemicals Mfg. Co., Ltd., Tokyo, Japan

[21] Appl. No.: 824,590

[22] Filed: Jan. 23, 1986

[30] Foreign Application Priority Data

May 21, 1985 [JP] Japan .................................. 60-106982
Sep. 25, 1985 [JP] Japan .................................. 60-210292

[51] Int. Cl.⁴ ................................................. C09C 3/00
[52] U.S. Cl. ............................. 106/308 M; 106/308 Q
[58] Field of Search ................ 106/308 M, 308 Q, 23, 106/30; 558/179, 180

[56] References Cited

U.S. PATENT DOCUMENTS

| | | | |
|---|---|---|---|
| 3,987,127 | 10/1976 | Dickie et al. ........................... | 427/44 |
| 3,996,059 | 12/1976 | Stansfield et al. .............. | 106/308 N |
| 4,042,413 | 8/1977 | Hauxwell et al. .............. | 106/308 N |
| 4,057,436 | 11/1977 | Davies et al. ................... | 106/308 N |
| 4,157,266 | 6/1979 | Hauxwell et al. ..................... | 106/23 |
| 4,163,749 | 8/1979 | Hauxwell et al. .............. | 106/308 N |
| 4,166,066 | 8/1979 | Hauxwell et al. .............. | 106/308 N |
| 4,224,212 | 9/1980 | Topham .......................... | 106/308 N |

*Primary Examiner*—Amelia Burgess Yarbrough
*Attorney, Agent, or Firm*—Oblon, Fisher, Spivak, McClelland & Maier

[57] ABSTRACT

There is provided a new pigment composition composed of a pigment and a dispersant wherein the dispersant is a phosphoric ester compound represented by the formula below.

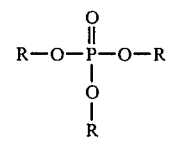

(where one or more than one of the three R's are residues of a hydroxy-carboxylic acid and/or hydroxy ester thereof; and one or two of the three R's, in case of being remained, are hydrogen atoms, cations, or residues of an alcohol excluding the above-mentioned residues.)

6 Claims, No Drawings

PIGMENT COMPOSITION

BACKGROUND OF THE INVENTION

1. Field of the Invention

The present invention relates a new pigment composition and, more particularly, to a pigment composition useful as a coloring material such as paint, printing ink, or a synthetic resin colorant in which a phosphonic ester compound containing a residue of hydraxy carboxylic acid and/or hydroxy ester thereof is used as the pigment dispersant or flushing agent.

2. Description of the Prior Art

In the conventional process for producing paints and printing inks, lecithin, which is one of phospholipids, has been used both as a dispersant for dispersing a pigment into a paint vehicle or printing ink varnish, and as a flushing agent for flushing the aqueous filter cake into an oil vehicle or oil varnish.

Being a natural phospholipid, lecithin is liable to oxidation and rancidity which lead to deterioration and putrefaction. Thus there has been a demand for a dispersant or flushing agent which is stabler and better than lecithin.

In view of the above-mentioned drawbacks of the conventional dispersant or flushing agent and in order to develop a new compound which is compatible with vehicles and varnishes and also with pigments and is useful as a pigment dispersant, the present inventors carried out a series of researches which led to the finding that a phosphoric ester obtained by reacting a hydroxy carboxylic acid and/or hydroxy ester thereof with phosphoric acid exhibits outstanding properties and effects required for pigment dispersants. The present invention was completed based on this finding.

SUMMARY OF THE INVENTION

Accordingly, it is an object of the present invention to provide a pigment composition composed of a pigment and a dispersant wherein the dispersant is a phosphoric ester compound represented by the formula below.

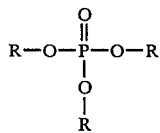

(where one or more than one of the three R's are residues of hydroxy carboxylic acid and/or hydroxy ester thereof; and one or two of the three R's in case of being remained, are hydrogen atoms, cations, or residues of an alcohol excluding the above-mentioned hydroxy carboxylic acid and/or hydroxy ester thereof.)

DETAILED DESCRIPTION OF THE INVENTION

The dispersant which characterizes the pigment composition of this invention is a specific phosphoric ester compound as defined above.

The phosphoric ester compound used in this invention can be obtained by various methods. According to a preferred method, it is obtained by reacting 1 mole of an ester-forming phosphorus compound with 3 moles, 2 moles, or 1 mole of a hydroxy carboxylic acid and/or hydroxy thereof.

When 1 mole of an ester-forming phosphorus compound is reacted with 3 moles of a hydroxy carboxylic acid and/or hydroxy ester thereof, there is obtained a phosphoric ester compound in which all of the three R's in the above formula are residues of a hydroxy carboxylic acid and/or hydroxy ester thereof. Also, when 1 mole of an ester-forming phosphorus compound is reacted with 2 moles or 1 mole of hydroxy carboxylic acid and/or hydroxy ester thereof, there is obtained a phosphoric ester compound in which one or two of the three R's in the above formula are residues of hydroxy carboxylic acid and/or hydroxy ester thereof.

Among the ester-forming phosphorus compounds that can be used in this invention are phosphorus oxychloride, phosphorus pentoxide, phosphorus trichloride, phosphoric anhydride, and acetyl phosphate. Preferable among them is phosphorus oxychloride.

The reaction of the above-mentioned ester-forming phosphorus compound with a hydroxy carboxylic acid and/or hydroxy ester thereof should preferably be carried out in an organic solvent which is both inert to the reactants and reaction products and solubilizes them. Examples of such organic solvents include aliphatic saturated hydrocarbons such as octane, petroleum ether, ligroin, mineral spirit, and kerosene; aromatic hydro-carbons such as benzene, toluene, and xylene; halogenated aliphatic hydrocarbons such as trichloroethane and tetrachloroethane; and chlorinated aromatic hydrocarbons such as dichlorobenzene and trichlorobenzene. They have been used for the production of polyesters.

In the case where a halogenated phosphorus compound such as phosphorus oxychloride is used as the ester-forming phosphorus compound, it is desirable to use as a catalyst a tertiary amine such as triethylamine; an organic base such as pyridine, 2,6-lutidine, and 1,8-diaza-bicyclo-(5.4.0)undecene-7; or an inorganic base such as oxides, hydroxides, carbonates and organic acid salts of alkali metals or alkaline earth metals.

In the case where one or two of the three R's in the above formula are hydrogen atoms or cations (mentioned later), a cation source mentioned later should be added to the reaction mixture to form a salt when the reaction of an ester-forming phosphorus compound with 2 moles or 1 mole of hydroxy carboxylic acid and/or hydroxy ester thereof is substantially complete, or after the hydrolysis is performed as required (in the case where a halogenated phosphorus compound is used as an ester-forming phosphorus compound). The cation source may be added before, during, or after the production of the pigment composition of this invention using the phosphoric ester compound of the above-mentioned formula, which has one or two residues of corboxylic acid and/or hydroxy ester thereof residues, with the remaining R's being hydrogen ions.

The preferred hydroxy-carboxylic acid used in this invention is one which has 4 to 30 carbon atoms. Examples of such hydroxycarboxylic acids include ricinoleic acid, 12-hydroxy-stearic acid, castor oil fatty acid, hydrogenated castor oil fatty acid δ-hydroxy-valeric acid, ε-hydroxy-caproic acid, p-hydroxyethyloxybenzoic acid, and 2-hydroxynaphthalene-6-carboxylic acid. They may be used individually or in combination with one another.

It is also possible to use, in the same manner a hydroxyl-terminated ester obtained by esterifying an alcohol the with carboxyl group of above-mentioned hydroxycarboxylic acid. Examples of the alcohol used for the esterification are alcohols having 1 to 30 carbon atoms, such as methyl alcohol, ethyl alcohol, propyl alcohol, butyl alcohol, hexyl alcohol, octyl alcohol, decyl alcohol, dodecyl alcohol, tridecyl alcohol, hexadecyl alcohol, octadecyl alcohol, tetracosyl alcohol, hexacosyl alcohol, octadecenyl alcohol, cyclohexyl alcohol, and benzyl, alcohol.

The phosphoric ester compound used as a dispersant in this invention is obtained by reacting 3 moles, 2 moles, or 1 mole of the above-mentioned hydroxy corboxylic acid and/or hydroxy ester thereof with 1 mole of the above-mentioned ester-forming phosphorus compound. Where 2 moles or 1 more of the above-mentioned corboxylic acid and/or hydroxy ester thereof is reacted with 1 mole of the phosphorus compound, one or two R's other than residues of corboxylec acid and/or hydroxy ester thereof in the above-mentioned formula may be groups other than the above-mentioned corboxylic acid and/or hydroxy ester thereof, such as residue of alcohol compounds, hydrogen atoms, inorganic cations, or organic cations. Examples of the alcohol residues are the residues of ordinary alcohols such as of the avobe-mentioned alcoholes used in the esterification of hydroxy-carboxylic acid.

Examples of inorganic cations include alkaline metals such as sodium and potassium; polyvalent metals such as magnesium, calcium, strontium, barium, manganese, iron, cobalt, nickel, zinc, aluminum, and tin; and ammonium. Examples of organic cations include cations of primary, secondary, and tertiary monoamines and polyamines having 1 to 30 carbon atoms such as methylamine, ethylamine, propylamine, butylamine, hexylamine, octylamine, dodecylamine, octadecylamine, oleylamine, diethylamine, dibutylamine, distearylamine, triethylamine, tributylamine, dimethyloctylamine, dimethyldecylamine, dimethyldodecylamine, dimethyltetradecylamine, dimethylhexadecylamine, dimethyloctadecylamine, dimethyloleylamine, dilaurylmonomethylamine, trioctylamine, dimethylaniline, ethylenediamine, propylene diamine, hexamethylenediamine, and stearylpropylenediamine; quaternary ammoniums such as octadecyl trimethylammonium and dioctadecyl dimethylammonium; and alkanolamines such as ethanolamine, diethanolamine, triethanolamine, dimethylethanolamine, diethylethanolamine, propanolamine, and other alkanolamines obtained by adding ethylene oxide to the above-mentioned higher aliphatic amine. These amines can be used individually or in combination with one another. Where a higher aliphatic amine or ammonium derived from natural oils and fats is used as a raw material, it is possible to the mixture of amines each differing in carbon number and degree of saturation as such.

The above-mentioned phosphoric ester compound used in this invention comes in different forms according to the substituent group R. The ones defined below are comparatively hydrophobic dispersants adequately soluble in an organic solvent. (1) All of the three R's are residues of hydroxyl ester of hydroxyl carboxylic acid. (2) The three R's are residues of hydroxy ester of hydroxyl carboxylic acid and residues of other alcohols. (3) One or two of the three R's are cations of a higher amine.

On the other hand, the compound of the above-formula in which one or two of the three R's are residues of hydroxyl carboxyled acid cations selected from the alkali metals, ammonium, lower amines, and lower alkanolamines, is a comparatively hydrophilic dispersant soluble or dispersible in water or aqueous solutions.

The pigment used in this invention may be any known organic pigment, inorganic pigment, or extender pigment. Examples of organic pigments include phthalocyanine pigments, azo-pigments, condensed azo-pigments, anthraquinone pigments perinone pigments, perylene pigments, indigo pigments thioindigo pigments, isoindolinone pigment, azomethinazo pigments, dioxadine pigments, quinacridone pigments, aniline black pigments, triphenylmethane pigments, and carbon black. Examples of inorganic pigments include titanium oxide pigments, iron oxide pigments, iron hydroxide pigments, chromium oxide pigments, spinel type calcined pigment, lead chromate pigments, vermilion pigments, Prussian Blue, aluminum powder, and bronze powder. Examples of extender pigments include calcium carbonate, barium sulfate, silicon dioxide, and aluminum hydroxide. These pigments are used in the form of dry fine powder, aqueous filter cake, or aqueous suspension.

The pigment composition of this invention is prepared by compounding 100 parts by weight of the above-mentioned pigment and 1 to 300 parts by weight, preferably 3 to 150 parts by weight, of the above-mentioned phosphoric ester compound. Needless to say, these two components are incorporated with a known proper organic solvent, aqueous or oily paint vehicle, aqueous or oily printing ink varnish, aqueous or oily coating vehicle, thermoplastic resin, thermosetting resin, plasticizer, crosslinking agent, and catalyst. The resulting composition can be used as such as a paint or printing ink. These essential components and optional components can be mixed and dispersed by any known method using a ball mill, sand mill, attritor, continuous horizontal medium dispersing machine, two-roll mill, three-roll mill, pressure kneader, Banbury mixer, or extruder.

In the case where a pigment in the form of an aqueous filter cake or aqueous suspension is used, the pigment composition of this invention can be prepared by the flushing method. According to this method, the pigment is transferred from the aqueous phase to the organic solvent phase by mixing the pigment with the comparatively hydrophobic dispersant among the dispersant used in this invention, alone or, preferably, in the form of a solution in a hydrophobic organic solvent (which may contain a binder for ink or paint).

The pigment composition of this invention may be embodied in the following two forms.

(1) A composition containing pigments in high concentrations, which is useful as a coloring agent for printing inks, paints, coating agents, and synthetic resins. In this embodiment, the concentration of pigment is 20 to 95 wt% and the concentration of the dispersant is 1 to 300 wt% for pigment weight.

(2) A compobbsition useful as a paint which contains a solvent, binder resin, etc. required for paints, printing inks, and coating agents. In this embodiment, the concentration of pigment is 0.1 to 20 wt% and the concentration of the dispersant is 1 to 300 wt% for pigment weight.

The paint mentioned above embraces all the known paints containing pigments. Examples include automobile paints, building paints, wood paints, vehicle and machine paints, household paints, plastics paints, precoat metal paints, can paints, ship paints, anticorrosion paints, photocurable paints, electron ray curable paints electrostatic coating powder paints, and vinylsol paints.

The printing ink mentioned above embraces all the known printing inks. Examples include letterpress ink, lithographic ink, rotogravure ink, screen ink, newspaper ink, and flexographic ink.

The pigment composition of this invention may be in the form of solid or liquid. In the latter case, the medium is water, a mixture of water and hydrophilic organic solvent, or an organic solvent. Examples of organic solvents include aliphatic, alicyclic, and aromatic hydro-carbons; halogenated hydrocarbons, esters, ketones, glycol ethers, and alcohols. They are not limitative.

The paint vehicle, printing ink varnish, and coating agent vehicle may be any known oily or aqueous binders which are selected according to uses. Examples of the binder include long-oil alkyd resin, medium-oil alkyd resin, short-oil alkyd resin, phenol-modified alkyd resin, styrenated alkyd resin, aminoalkyd resin, oil-free alkyd resin, thermosetting acrylic resin, acryl lacquer resin, acrylpolyol resin, polyester resin, epoxy resin, butylated melamine resin, methylated melamine resin, ureamelamine resin, phenolic resin, rosin-modified phenolic resin, rosin-modified maleic acid resin, phenol-modified maleic acid resin, polyurethane resin, styrene resin, styrene-acrylic resin, styrene-diene copolymer, vinyl chloride copolymer, vinyl-acetate resin, vinyl acetate copolymer, ethylene-vinyl acetate resin, butyral resin, petroleum resin, rosin ester, maleinized rosin ester, drying oil, and boiled oil.

Examples of thermoplastic resins include polyvinyl chloride resin, polystyrene resin, acrylonitrile-styrene resin, acrylic resin, methacrylic-styrene resin, and polyester resin.

Examples of plasticizers include phthalic esters, adipic ester, sebacic esters, polyester plasticizer, and epoxidized soybean oil.

If necessary, the pigment composition of this invention may be used in combination with a known pigment dispersant or flushing agent such as higher aliphatic monoamine, higher aliphatic diamine, and acetate thereof and higher fatty acid salt thereof.

The phosphoric ester compound containing a polyester chain which is used in the present invention is not in danger of deterioration and putrefaction due to oxidation and rancidity, unlike lecithin as a natural phospholipid, which has been conventionally used as a pigment dispersant for paints, printing inks, and plastics colorants, It has good stability and produces an outstanding effect in the surface modification of pigments and the dispersion of pigments in a medium.

The phosphoric ester compound of this invention is readily adsorbed on the pigment surface due to the electronic attraction produced by the phosphoric ester linkage and the ester linkage contained therein and the affinity for mediums produced by the hydrocarbon chain contained therein. This adsorption improves the wettability, dispersibility, and flowability of pigments. In addition, the phosphoric ester compound is useful as a flushing agent for the aqueous filter cake of pigment. It makes the pigment surface lipophilic or hydrophobic, permitting effective flushing of pigments.

The invention is now described in more detail with reference to referential examples (production of the phosphoric ester compound) and working examples. (In examples, quantities are expressed as parts by weight or percent by weight.)

REFERENTIAL EXAMPLE 1

Synthesis of Phosphoric Triester Compound

Into a four-mouth glass reactor equipped with a stirrer, thermometer, dropping funnel, and reflux condenser and placed in a water bath were charged 50.5 parts of mixture of dodecyl alcohol esters and tridecyl alcohol esters of 12-hydroxyl stearic acid (gramequivalent:505) (1), 50.5 parts of benzene, and 9.5 parts of pyridine, followed by stirring and dissolution. The dropping funnel was filled with 5.1 parts of phosphorus oxychloride.

The equivalent ratio of the hydoroxy ester mixture, phosphorus oxychloride, and pyridine was 3:3:3.6.

While stirring and cooling the reaction mixture (below 10° C.), phosphorus oxychloride was added dropwise from the dropping funnel over 60 minutes. After addition, the reaction mixture was gradually warmed to 80° C. over 2 hours and the reaction was continued for 2 hours with stirring, followed by cooling.

For the removal of pyridine (as a dehydrochlorination catalyst) and pyricine hydrochloride, the reaction mixture was filtered and washed with an equal amount of deionized water, half an amount of water acidified with hydrochloric acid, and three times with half an amount of deionized water using a separatory funnel. The washed benzene layer was dried with sodium sulfate and benzene was distilled away under vacuum. Thus there was obtained a pale brown liquid reaction porduct.

The reaction product was identified as a phosphoric triester compound of the 12-hydroxy-stearic acid by the infrared absorption spectrum and gel permeation chromatograph. The average molecular weight of the principal component of this compound was 1,300–1,400. (Dispersant 1).

REFERENTIAL EXAMPLES 2 TO 12

Various phosphoric triester compounds were prepared in the same manner as in Referential Example 1, except that the reactants were replaced by those which are shown in Table 1 below.

TABLE 1

| No. | Reactants | (I)* | (II)** |
|---|---|---|---|
| 2 | (Dispersant 2) | | |
| | Mixture of dodecyl and tridecyl esters of ricinoleic acid | 3 | 1300–1400 |
| | Phosphorus oxychloride | 3 | |
| 3 | (Dispersant 3) | | |
| | Stearyl ester of 12-hydroxy-stearic acid | 3 | 1600–1700 |
| | Phosphorus oxychloride | 3 | |
| 4 | (Dispersant 4) | | |
| | Methyl ester of 12-hydroxy-stearic acid | 3 | 900–1000 |
| | Phosphorus oxychloride | 3 | |
| 5 | (Dispersant 5) | | |
| | Methyl ester of ricinolic acid | 3 | 900–1000 |
| | Phosphorus oxychloride | 3 | |
| 6 | (Dispersant 6) | | |
| | Mixture of tetracosyl and hexacosyl esters of 12-hydroxy-stearic acid | 3 | 1800–2000 |
| | Phosphorus oxychloride | 3 | |
| 7 | (Dispersant 7) | | |
| | Mixture of theracosyl and hexacosyl esters of ricinolic acid | 3 | 1800–2000 |
| | Phosphorus oxychloride | 3 | |
| 8 | (Dispersant 8) | | |
| | Butyl ester of 12-hydroxy-stearic acid | 3 | 1000–1100 |

TABLE 1-continued

| No. | Reactants | (I)* | (II)** |
|---|---|---|---|
| 9 | Phosphorus oxychloride<br>(Dispersant 9) | 3 | |
| 10 | Butyl ester of ricinoler acid<br>Phosphorus oxychloride<br>(Dispersant 10) | 3<br>3 | 1000–1100 |
| 11 | Methyl ester of ε-hydroxy-caproic acid<br>Phosphorus oxychloride<br>(Dispersant 11) | 3<br>3 | 400–500 |
| 12 | 12-hydroxy-stearic acid<br>Phosphorus oxychloride<br>(Dispersant 12) | 3<br>3 | 800–900 |
| | Ricinolic acid<br>Phosphorus oxychloride | 3<br>3 | 800–900 |

*Amount of the reactants (in equivalents)
**Average molecular weight of the principal component of the resulting phosphate triester.

REFERENTIAL EXAMPLE 13

Into a four-mouth glass reactor (the same one as used in in Referential Example 1) equipped with a stirrer, thermometer, dropping funnel, and reflux condenser were charged 14.2 parts of phosphorus oxychloride. 92.8 parts of mixture of dodecyl and tridecyl esters of 12-hydroxystearic acid having 502 of gram epuivalent, which had been mixed with and dissolved in 92.8 parts of benzene and 17.4 parts of pyridine, was slowly added dropwise at 5° to 10° C. over 2 hours. The reaction was carried out at 10° C. for 1 hour. Further, 32.3 parts of the methyl ester of 12-hydroxystearic acid having 351 of gram equivalent, which had been mixed with and dissolved in 32.3 parts of benzene and 8.8 parts of pyridine, were slowly added dropwise at 10° to 20° C., over 1 hour. The reaction mixture was gradually raised to 80° C. over 3 hours and the reaction was carried out for 2 hours at 80° C. with stirring. Finally, the reaction product was cooled.

The equivalent ratio of the mixture of dodecyl and tridecyl esters the methyl ester, phosphorus oxychloride, and pyredene was 2:1:3:3.6.

The cooled reaction product was filtered washed, purified, dried, concentrated, and desolvated in the same manner as in Referential Example 1. Thus there was obtained a pale brown liquid.

The reaction product was identified as a phosphoric triester of the alkyl ester and methyl ester of poly-12-hydroxystearic acid in the same way as in Referential Example 1. The average molecular weight of the principal component of the principal component of this compound was about 1,200–1,300 (Dispersant 13).

REFERENTIAL EXAMPLE 14 TO 20

Various phosphoric triester compounds were prepared in the same manner as in Referential Example 13, except that the reactants were replaced by those which are shown in Table 2 below.

TABLE 2

| No. | Reactants | (I)* | (II)** |
|---|---|---|---|
| 14 | (Dispersant 14) | | |
| | Mixture of dodecyl and tridecyl esters of ricinoleic acid | 2 | 1200–1300 |
| | Methyl ester of ricinolic acid | 1 | |
| | Phosphorus oxychloride | 3 | |
| 15 | (Dispersant 15) | | |
| | Mixture of tetracosyl and hyxacosyl esters of 12-hydroxyl-stearic acid | 2 | 1600–1700 |
| | Butyl ester of 12-hydroxy-stearic acid | 1 | |

TABLE 2-continued

| No. | Reactants | (I)* | (II)** |
|---|---|---|---|
| 16 | Phosphorus oxychloride<br>(Dispersant 16) | 3 | |
| | Mixture of tetracosyl and heyacoxyl ester of rinoleic acid | 2 | 1600–1700 |
| | Butyl ester of rinoleic acid | 1 | |
| 17 | Phosphorus oxychloride<br>(Dispersant 17) | 3 | |
| | Mixture of dodecyl and tridecyl esters of 12-hydroxy-stearic acid | 2 | 1000–1100 |
| | Decyl alcohol | 1 | |
| 18 | Phosphorus oxychloride<br>(Dispersant 18) | 3 | |
| | Mixture of dodecyl and decyl esters of inoleic acid | 2 | 1000–1100 |
| | Oleyl alcohol | 1 | |
| 19 | Phosphorus oxychloride<br>(Dispersant 19) | 3 | |
| | Mixture of odecyl and tridecyl esters of 12-hydroxy-stearic acid | 1 | 800–900 |
| | Dodecyl alcohol | 2 | |
| 20 | Phosphorus oxychloride<br>(Dispersant 21) | 3 | |
| | Mixture of dodecyl and tridecyl esters of rinoleic acid | 1 | 900–1000 |
| | Oleyl alcohol | 2 | |
| | Phosphorus oxychloride | 3 | |

*Amount of the reactants (in equivalents)
**Average molecular weight of the principal component of the resulting phosphoric tri-ester.

REFERENTIAL EXAMPLE 21

Synthesis of a Phosphoric Diester Compound

A four-month glass reactor equipped with a stirrer, thermonerer, dropping funnel, and reflux condenser was provided. The reflux condenser was connected to a safety bottle and a bydrogen chloride gas absorbing bottle which was further connected to a vacuum pump and mercury manometer.

In the reactor were charged 3.0 parts of phosphorus oxychloride. The dropping fulled was filled with 98.8 parts of a mixtyre of dodecyl and trideoyl esters of 12-hydroxy-esteric acid (1 gram equivalent=505) and 98.8 parts of benzene as a solvent.

With the reactor cooled with iced water, the benzene solution was added dropwise at 5° to 10° C. The reactants were stirred at 10° C. for 1 hour. The reactor was gradually evacuated while increasing the reaction temperature. Hydrogen chloride gas formed by the reaction was absorbed by an aqueous solution of sodium hydroxide filled in the absorbing bottle. The reaction temperature was gradually raised to 40° C. and the reaction system was gradually evacuated to 100 mmHg over 5 hours. When the evolution of hydrogen chloride gas was not noticed any longer, the reaction system was cooled. In this state, the reaction system contains phosphoric (alkyl ester of 12-hydroxystearic acid) monoester dichloride. The dropping funnel was filled with 98.8 parts of the above-mentioned alkyl ester, 98.8 parts of benzene, and 19.8 parts of triethylamine, followed by mixing and dissolution. The resulting solution was added dropwise at 10° to 20° C. to the reactor over 60 minutes, followed by stirring for 2 hours. The reaction temperature was raised to 40° C. over 2 hours, and stirring was continued for 2 hours. The reactor was cooled.

The equivalent ratio of the alkyl ester of 12-hydoxy stearic acid, phosphorus oxychloride, and triethylamine was 2:3:1.

The reaction liquid was washed with water, a dilute aqueous solution of sodium hydroxide, a dilute aqueous solution of the hydrochloric acid, and water, for the dechlorination (hydrolysis) of phosphoric ester chloride and removal of chloride and the removal of triethylamine hydrochloride. The washed benzene layer was dried with sodium sulfate, and benzene was distilled away under reduced pressure. Thus there was obtained a pale brown liquid reaction product.

It was confirmed by infrared absorption spectrum and gel permeation chromatograph that the reaction product is composed mainly of a phosphoric diester compound of the alkyl ester of 12-hydroxystearic acid. (Dispersant 21).

The average molecular weight of the principal component was 900 to 1,000.

REFERENTIAL EXAMPLE 22 TO 32

Various phosphoric diester compounds were prepared in the same manner as in Referential Example 21, except that the reactants were replaced by those which are shown in Table 3 below.

TABLE 3

| No. | Reactants | (I)* | (II)** |
|---|---|---|---|
| 22 | (Dispersant 22) | | |
| | Mixture of decyl and tridecyl esters of ricinoleic acid | 2 | 900–1000 |
| | Phosphorus oxychloride | | |
| 23 | (Dispersant 23) | | |
| | Stearyl ester of 12-hydroxy-stearic acid | 2 | 1050–1150 |
| | Phosphorus oxychloride | 3 | |
| 24 | (Dispersant 24) | | |
| | Methyl ester of 12-hydroxy-stearic acid | 2 | 600–700 |
| | Phosphorus oxychloride | 3 | |
| 25 | (Dispersant 25) | | |
| | Methyl ester of ricinolic acid | 2 | 600–700 |
| | Phosphorus oxychloride | 3 | |
| 26 | (Dispersant 26) | | |
| | Mixture of tetracosyl and heyacoxyl esters of 12-hydroxy-stearic acid | 2 | 1250–1350 |
| | Phosphorus oxychloride | 3 | |
| 27 | (Dispersant 27) | | |
| | Mixture of tetracosy and heyacoxyl esters ricinolic acid | 2 | 1250–1350 |
| | Phosphorus oxychloride | 3 | |
| 28 | (Dispersant 28) | | |
| | Butyl ester of 12-hydroxy-stearic acid | 2 | 700–780 |
| | Phosphorus oxychloride | 3 | |
| 29 | (Dispersant 29) | | |
| | Butyl ester of ricinoleic acid | 2 | 700–780 |
| | Phosphorus oxychloride | 3 | |
| 30 | (Dispersant 30) | | |
| | Methyl ester of ε-hydroxy-caproic acid | 2 | 320–350 |
| | Phosphorus oxychloride | 3 | |
| 31 | (Dispersant 31) | | |
| | 12-hydroxy-stearic acid | 2 | 600–650 |
| | Phosphorus oxychloride | 3 | |
| 32 | (Dispersant 32) | | |
| | Ricinolic acid | 2 | 600–650 |
| | Phosphorus oxychloride | 3 | |

*Amount of the reactants (in equivalents)
**Average molecular weight of the principal component of the resulting phosphate diester.

REFERENTIAL EXAMPLE 33

Into the same four-mouth glass reactor as used in Referential Example 21, which was equipped with a stirrer, thermometer, dropping funnel, evacuating system, and hydrogen chloride gas absorber, was charged 30 parts of phosphorus oxychloride.

The dropping funnel was filled with 98.8 parts of mixture of dodecyl and tridecyl esters of 12-hydroxy stearic acid hameng 505 of gramequivalent) and 98.8 parts of benzene as a solvent. The reaction was carried out in the same manner as in Referential Example 21 to give phosphoric (alkyl ester of 12-hydroxystearic acid) monoester dichloride. Then, 68.6 parts of the methyl ester of 12-hydroxystearic acid (gram equivalent=351) was mixed with and dissolved in 68.6 parts of benzene and 19.8 parts of triethylamine. The reaction was carried out in the same manner as in Referential Example 21.

The equivalent ratio of alkylestero mixture, methyl ester phosphorus oxychloride, and triethylamine was 1:1:3:1.

After cooling, the reaction liquid underwent dechlorination (hydrolysis), washing, purification, drying, concentration, and desolvation in the same manner as in Referential Example 21. Thus there was obtained a brown liquid reaction product.

It was confirmed by infrared absorption spectrum and gel permeation chromatograph that the reaction product is composed mainly of a phosphoric diester of mixtur alkyl esters of 12-hydroxystearie acid and methyl ester of 12-hydroxystearic acid. (Dispersant 33).

The average molecular weight of the principal component was about 800 to 850.

REFERENTIAL EXAMPLES 34 TO 40

Various phosphoric diester and monoester compounds were prepared in the same manner as in Referential Example 33, except that the reactants were replaced by those which are shown in Table 4 below.

TABLE 4

| No. | Reactants | (I)* | (II)** |
|---|---|---|---|
| 34 | (Dispersant 34) | | |
| | Mixture of dodecyl and tridecyl esters of ricinoleic acid | 1 | 800–850 |
| | Methyl ester of ricinolic acid | 1 | |
| | Phosphorus oxychloride | 3 | |
| 35 | (Dispersant 35) | | |
| | Mixture of etracixyl and hexacoxyl esters of 12-hydroxy-stearic acid | 1 | 950–1050 |
| | Butyl ester of 12-hydreostearic acid | 1 | |
| | Phosphorus oxychloride | 3 | |
| 36 | (Dispersant 36) | | |
| | Mixture of tetracosyl and hexacosyl ester of ricinoleic acid | 1 | 950–1050 |
| | Butyl ester of ricinoleic acid | 1 | |
| | Phosphorus oxychloride | 3 | |
| 37 | (Dispersant 37) | | |
| | Mixture of dodecyl and tridecyl esters of 12-hydroxy-stearic acid | 1 | 650–720 |
| | Dedecyl alcohol | 1 | |
| | Phosphorus oxychloride | 3 | |
| 38 | (Dispersant 38) | | |
| | Mixture of dodecyl and tridecyl esters of ricinoleic acid | 1 | 700–800 |
| | Oleyl alcohol | 1 | |
| | Phosphorus oxychloride | 3 | |
| 39 | (Dispersant 39) | | |
| | Mixture of dodecyl and tridecyl esters of 12-hydroxy-stearic | 1 | 500–560 |
| | Dodecyl alcohol | 1 | |
| | Phosphorus oxychloride | 3 | |
| 40 | (Dispersant 40) | | |
| | Mixture of dodecyl and tridecyl esters of ricinoleic acid | 1 | 500–560 |

TABLE 4-continued

| No. | Reactants | (I)* | (II)** |
|---|---|---|---|
|  | Phosphorus oxychloride | 3 |  |

*Amount of the reactants (in equivalents)
**Average molecular weight of the principal component of the resulting phosphate diester or monoester.

EXAMPLE 1

Into a flusher were charged 238 parts of an aqueous filter cake (pigment content=42%) of copper phthalocyanine blue pigment (C.I. pigment Blue 15-3). To the flusher were further added 60 parts of Dispersant 1 (obtained in Referential Example 1) dissolved in 40 parts of a petroleum ink solvent. Flushing was carried out by mixing in the usual way. As compared with the conventional flushing agent, the dispersant in this example more readily freed water from the cake and transferred the copper phthalocyanine blue pigment to the oily dispersant phase.

After complete removal of water, there was obtained a flushed color containing copper phthalocyanine blue pigment. This flushed color was made into an offset litho ink according to the following formulation.

| Flushed color (pigment = 50%) | 38.0 parts |
|---|---|
| Litho varnish | 60.0 parts |
| 5% cobalt drier | 0.2 parts |
| 8% manganese drier | 1.0 parts |
| Ink solvent | 0.8 parts |
| Total | 100.0 parts |

The litho varnish is formulated as follows:

| Rosin-modified phenolic resin | 35.0 parts |
|---|---|
| Drying oil | 25.0 parts |
| Drying oil-modified isophthalic acid alkyd | 10.0 parts |
| Ink solvent | 29.5 parts |
| Aluminum chelator | 0.5 parts |
| Total | 100.0 parts |

The ink thus prepared was used offset printing on uncoated printing paper. There was obtained a printed matter of bright cyan color.

A flushed color was prepared in the same manner as above from an aqueous filter cake (pigment content=27%) of disazo yellow pigment (C.I. pigment yellow 12) and an aqueous filter cake (pigment content=25%) of brilliant carmine 6B pigment (C.I pigment red 57-1). The flushed color was made into a yellow and a magenta offset litho ink.

A flushed color was prepared in the same manner as above from an aqueous filter cake of lake red C pigment (C.I. pigment red 53-1), and the flushed color was made into a bronze red offset litho ink. A flushed color was also prepared from an aqueous filter cake of copper phthalocyanine green pigment (C.I. pigment green 7), and the flushed color was made into a green offset litho ink.

The dispersant readily freed water in the flushing operation and readily transferred the pigment to the oil phase. In addition, the flushed color was easily made into inks and the resulting inks gave a printed matter of bright color in offset litho printing.

When tested as mentioned above, Dispersants 2 to 20 also produced the same effect as Dispersant 1.

EXAMPLE 2

Using Dispersant 1 obtained in Referntial Example 1, carbon black pigment was mixed with the dispersed into varnish on a three-roll mill according to the following formulation.

| Carbon black pigment | 20 parts |
|---|---|
| Dispersant 1 | 6 parts |
| Offset litho ink varnish | 69 parts |
| Total | 95 parts |

The resulting carbon black dispersion was made into a carbon black ink by uniform mixing according to the following formulation.

| Carbon black dispersion | 95.0 parts |
|---|---|
| 5% cobalt drier | 0.2 parts |
| 8% manganese drier | 1.0 parts |
| Ink solvent | 3.8 parts |
| Total | 100.0 parts |

The ink thus prepared was used for offset printing to give a printed matter of high balckness. When tested as mentioned above, Dispersants 2 to 19 also produced the same effect as Dispersant 1.

The yellow ink, magenta ink, cyan ink, and black ink prepared in this example were used as a four-color process ink for offset litho printing to give a bright beautiful multicolor printed matter.

EXAMPLE 3

A blue quick drying enamel (air drying type) for metallic materials (e.g., machines and vehicles) was produced according to the following formulation.

| Flushed color (pigment = 50%) of copper phthalocyanine blue obtained in Example 1 | 10.8 parts |
|---|---|
| Rutile titanium white | 2.0 parts |
| Fast drying styrenized alkyd resin | 72.6 parts |
| Xylene | 6.6 parts |
| Mineral spirit | 7.6 parts |
| 6% cobalt naphthenate | 0.3 parts |
| Antiskinning agent | 0.1 parts |
| Total | 100.0 parts |

The resulting enamel provided bright beautiful coatings.

Flushed colors were prepared in the same manner as in Example 1 from an aqueous filter cake of disazo yellow pigment (C.I pigment yellow 14), fast yellow pigment (formed by coupling acetoacetanilide by diazotizing 4-aminophthalimide), watchung red pigment (C.I. pigment red 48), and carmine FB pigment (C.I. pigment red 3). The flushed colors were made into paints of varied colors according to the above-mentioned formulation. The paints gave bright beautiful coated plates.

EXAMPLE 4

A dispersion of copper phthalocyanine blue (C.I. pigment blue 15-3) in a xylene-butanol mixed solvent was prepared by dispersing the pigment using a continuous horizontal medium dispersing machine according to the following formulation.

| | |
|---|---|
| Copper phthalocyanine blue pigment (dried and pulverized) | 10 parts |
| Dispersant 1 obtained in Referential Example 1 | 2 parts |
| Xylene | 13 parts |
| Butanol | 5 parts |
| Total | 30 parts |

The resulting dispersion was made into an acrylic lacquer enamel for automobiles according to the following formulation.

| | |
|---|---|
| Solvent dispersion above-mentioned | 3.0 parts |
| Rutile titanium white | 14.0 parts |
| Thermoplastic acrylic resin | 70.0 parts |
| Toluene | 6.8 parts |
| Xylene | 3.2 parts |
| Butanol | 2.2 parts |
| Cellosolve | 0.8 parts |
| Total | 100.0 parts |

The resulting enamel provided bright beautiful coatings.

When tested as mentioned above, Dispersants 2 to 20 also produced the same effect as Dispersant 1.

EXAMPLE 5

Into a flusher were charged 238 parts of an aqueous filter cake (pigment content=42%) of copper phthalocyanine blue pigment (C.I. pigment blue 15-3) and 60 parts of the amine salt of Dispersant 21 dissolved in 40 parts of a petroleum ink solvent. (The amine salt was prepared by neutralizing the phosphoric acid radical of Dispersant 21 with about one equivalent of rosin amine.) Flushing was performed in the usual way. As compared with known flushing agents, the amine salt of Dispersant 20 more readily freed water from the filter cake and more readily transferred the copper phthalocyanine blue pigment to the oily dispersant phase.

After the complete removal of water, there was obtained a flushed color containing copper phthalocyanine blue pigment. The resulting flushed color was made into an offset litho printing ink according to the following formulation.

| | |
|---|---|
| Flushed color (pigment content = 50%) | 38.0 parts |
| Offset litho ink varnish | 60.0 parts |
| 5% cobalt drier | 0.2 parts |
| 8% manganese drier | 1.0 parts |
| Ink solvent | 0.8 parts |
| Total | 100.0 parts |

The litho varnish was formulated as follows:

| | |
|---|---|
| Rosin-modified phenolic resin | 35.0 parts |
| Drying oil | 25.0 parts |
| Drying oil-modified isophthalic acid alkyd | 10.0 parts |
| Ink solvent | 29.5 parts |
| Aluminum chelator | 0.5 parts |
| Total | 100.0 parts |

The ink thus prepared was used for offset printing on uncoated printing paper. There was obtained a printed matter of bright cyan color.

A flushed color was prepared in the same manner as above from avn aqueous filter cake (pigment content=27%) of disazo yellow pigment (C.I. pigment yellow 12) and an aqueous filter cake (pigment content=25%) of brilliant carmine 6B pigment (C.I. pigment red 57-1). The flushed color was made into a yellow and a magenta offset litho ink.

A flushed color was prepared in the same manner as above from an aqueous filter cake of lake red C pigment (C.I. pigment red 53-1), and the flushed color was made into a bronze red offset litho ink. A flushed color was also prepared from an aqueous filter cake of copper phthalocyanine green pigment (C.I. pigment greem 7), and the flushed color was made into a green offset litho ink.

The dispersant readily freed watrer in the flushing operation and readily transferred the pigment to the oil phase. In addition, the flushed color was easily made into inks and the resulting inka gave a printed matter of bright in offset litho printing.

When tested as mentioned above, Dispersants 21 to 39 also produced the same effect as Dispersant 21.

The same superior effect as mentioned above was produced when the dispersant was neutralized with coconut amine, beef tallow propylene diamine, or hydroxides of calcium, strontium, or aluminum, in place of rosin amine.

EXAMPLE 6

Using Dispersant 21 obtained in Referential Example 21, carbon black pigment was mixed with and dispersed into varnish on a three-roll mill according to the following formulation.

| | |
|---|---|
| Carbon black pigment | 20 parts |
| Beef tallow propylene diamine salt of Dispersant 21 | 6 parts |
| Offset litho ink varnish | 69 parts |
| Total | 95 parts |

The resulting carbon black dispersion was made into a carbon black ink by uniform mixing according to the following formulation.

| | |
|---|---|
| Carbon black dispersion | 95.0 parts |
| 5% cobalt drier | 0.2 parts |
| 8% manganese drier | 1.0 parts |
| Ink solvent | 3.8 parts |
| Total | 100.0 parts |

The ink thus prepared was used for offset printing to give a printed matter of high blackness. When tested as mentioned above, Dispersants 22 to 40 also produced the same effect as Dispersant 21.

The same superior effect as mentioned above was produced when the dispersant was neutralized with rosin amine, coconut amine, coconut propylene diamine, or hydroxide of calcium, strontium, or aluminum in place of beef tallow propylene diamine.

The yellow ink, magenta ink, cyan ink, and black ink prepared in this example were used as a four-color process ink for offset litho printing to give a bright beautiful multicolor printed matter.

EXAMPLE 7

A blue quick drying enamel (air drying type) for metallic materials (e.g., machines and vehicles) was produced according to the following formulation.

| | |
|---|---|
| Flushed color (pigment = 50%) of copper | 10.8 parts |

| | |
|---|---|
| phthalocyanine blue obtained in Example 5 | |
| Rutile titanium white | 2.0 parts |
| Fast drying styrenized alkyd resin | 72.6 parts |
| Xylene | 6.6 parts |
| Mineral spirit | 7.6 parts |
| 6% cobalt naphthenate | 0.3 parts |
| Antiskinning agent | 0.1 parts |
| Total | 100.0 parts |

The resulting enamel provided bright beautiful coatings.

Flushed colors were prepared in the same manner as in Example 5 from an aqueous filter cake of disazo yellow pigment (C.I. pigment yellow 14), fast yellow pigment (formed by coupling acetoacetanilide by diazotizing 4-aminophthalimide), watchung red pigment (C.I. pigment red 48), and carmine FB pigment (C.I. pigment red 3). The flushed colors were made into paints of varied colors according to the above-mentioned formulation. The paints gave bright beautiful coate plates.

EXAMPLE 8

A dispersion of copper phthalocyanine blue (C.I. pigment blue 15-3) in a xylene-butanol mixed solvent was prepared by dispersing the pigment using a continuous horizontal medium dispersing machine according to the following formulation.

| | |
|---|---|
| Copper phthalocyanine blue pigment (dried and pulverized) | 10 parts |
| Salt of Dispersant 21 obtained in Referential Example 21 (neutralized with about one equivalent of triethylamine) | 2 parts |
| Xylene | 13 parts |
| Butanol | 5 parts |
| Total | 30 parts |

The resulting dispersion was made into an acrylic lacquer enamel for automobiles according to the following formulation.

| | |
|---|---|
| Solvent dispersion above-mentioned | 3.0 parts |
| Rutile titanium white | 14.0 parts |
| Thermoplastic acrylic resin | 70.0 parts |
| Toluene | 6.8 parts |
| Xylene | 3.2 parts |
| Butanol | 2.2 parts |
| Cellosolve | 0.8 parts |

| | |
|---|---|
| Total | 100.0 parts |

The resulting enamel provided bright beautiful coatings.

When tested as mentioned above, Dispersants 22 to 40 also produced the same effect as Dispersant 21.

The same superior effect as mentioned above was produced when the dispersant was neutralized with rosin amine, coconut amine, beef tallow propylene diamine, coconut propylene diamine, or hydroxide of calcium, strontium, or aluminum, in place of triethylamine.

What is claimed is:

1. A pigment composition composed of a pigment and a dispersant characterized in that the dispersant is a phosphoric ester compound represented by the formula:

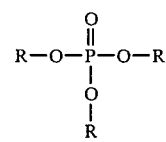

where at least one R is a residue containing carboxyl group and/or alcohol ester group of carboxyl group, derived from a hydroxy-carboxylic acid and/or alcohol ester thereof, and any remaining R is a hydrogen atom, a cation, or a residue of an alcohol.

2. A pigment composition as set forth in claim 1, which further comprises a solvent and resin binder.

3. A pigment composition as set forth in claim 1, wherein each R is the residue derived from a hydroxy-carboxylic acid, and/or alcohol esters thereof.

4. A pigment composition as set forth in claim 1, wherein two of the R's are the residues derived from a hydroxy-carboxylic acid, and/or alcohol esters thereof.

5. A pigment composition as set forth in claim 1, wherein one R is the residue derived from a hydroxy-carboxylic acid and/or hydroxy esters thereof.

6. A pigment composition as set forth in claim 1, wherein the hydroxy-carboxylic acid and/or alcohol ester thereof is at least one selected from the group consisting of ricinolic acid, hydroxystearic acid, castor oil fatty acid, hydrogenated castor oil fatty acid, hydroxyvaleric acid, hydroxycaproic acid, hydroxyethyloxybenzoic acid, and hydroxynaphthalene-carboxylic acid and alcohol esters thereof.

* * * * *